United States Patent [19]

Roellin

[11] Patent Number: 4,950,099
[45] Date of Patent: Aug. 21, 1990

[54] RELEASABLE CLAMPING-TYPE COMPRESSIVE JOINT

[75] Inventor: Ulrich Roellin, Zürich, Switzerland

[73] Assignee: Swiss Aluminum Ltd., Chippis, Switzerland

[21] Appl. No.: 448,336

[22] Filed: Dec. 11, 1989

[30] Foreign Application Priority Data

Dec. 20, 1988 [CH] Switzerland .................. 4690/88

[51] Int. Cl.$^5$ ............................................. F16B 27/00
[52] U.S. Cl. ................... 403/348; 403/407.1; 411/85
[58] Field of Search ............... 403/407.1, 406.1, 348; 411/84, 85

[56] References Cited

U.S. PATENT DOCUMENTS

| 3,908,330 | 9/1975 | Frach et al. ............... 403/348 X |
| 4,035,097 | 7/1977 | Bachand ........................ 403/348 |
| 4,662,776 | 5/1987 | Hedstrom et al. ........ 403/348 X |

FOREIGN PATENT DOCUMENTS

| 0136264 | 4/1985 | European Pat. Off. . |
| 1503588 | 3/1978 | United Kingdom . |

Primary Examiner—Andrew V. Kundrat
Attorney, Agent, or Firm—Bachman & LaPointe

[57] ABSTRACT

The clamping type compressive joint made between a continous section (10) and a component (14) is created by means of at least one clamping plate (16) that can be introduced from the front into an undercut groove (12) and rotated by a securing bolt (18). On tightening the securing bolt (18) the continuous section (16) is partly deformed by the clamping plate/plates (16). Each of the section flanges (22), which tend to taper in cross-section in the direction of the longitudinal opening (20) of groove (12), features at least one weakening notch (24) running in the longitudinal direction (c). Clamping cam tips (26) on flanges (22) lying beyond these weakening notches (24) are, after tightening the securing bolt (18), plastically deformed in the region of the clamping plate/plates (16) which is/are essentially in plan view in the form of a parallelpiped and is/are rotated 30°-60° in the groove (12). Four mechanical steps (64) are formed per clamping plate (16) along with clamping cam tips (20) bent over at the same distance from the longitudinal opening to produce configurational locking.

10 Claims, 4 Drawing Sheets

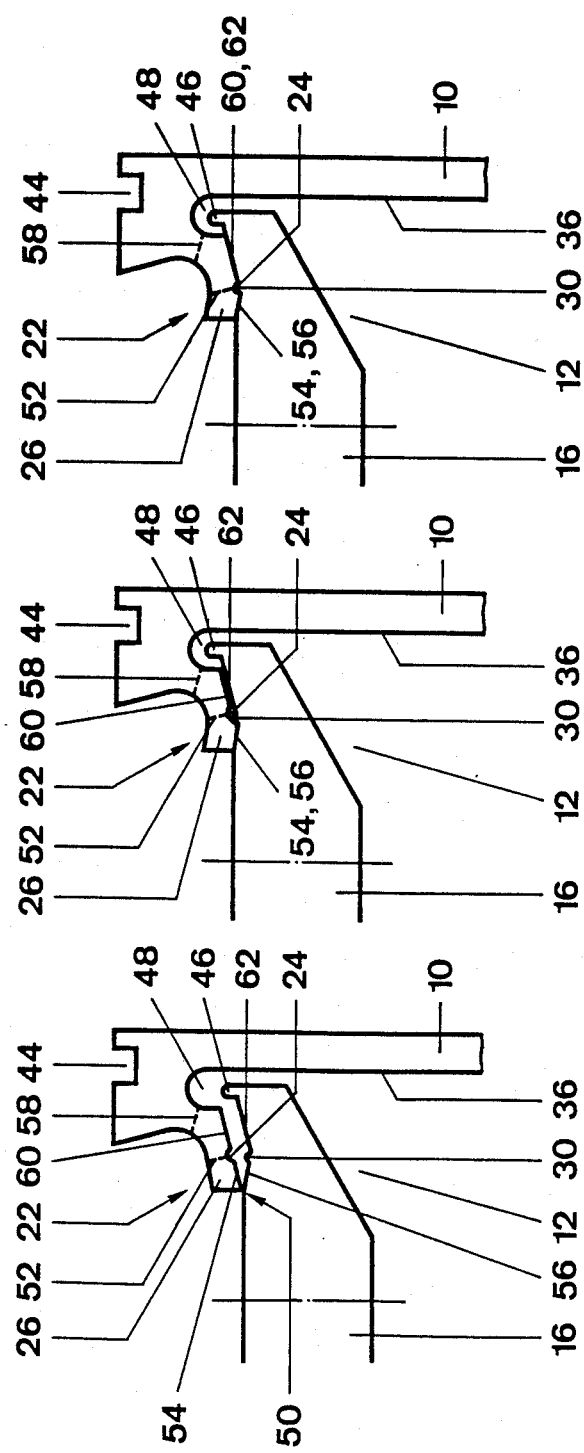

RELEASABLE CLAMPING-TYPE COMPRESSIVE JOINT

BACKGROUND OF THE INVENTION

The invention relates to a releasable clamping-type compressive joint the compressive joint is made between on the one hand a continuous extruded section having at least one longitudinal opening that features a groove undercut on both sides running in the longitudinal direction and on the other hand a component having of at least one clamping plate that can be introduced into the groove from the front and turned with a securing bolt, said plates/plate engaging with the extrusion flanges forming the undercut part of the groove, and such that on tightening the securing bolt the continuous section is to some extent deformed by the securing plate/plates. Further, the invention relates to a process for connecting a continuous, extruded section to a component.

Clamping-type compressive joints such as mentioned above are used mainly in vehicle and building construction. The clamping plate which is turned by the securing bolt and engages with the inner wall of the groove also serves the particular purpose of preventing the said component from being displaced in the longitudinal direction of the section. Solutions have been sought therefore in which the frictional locking is complimented or replaced by configurational locking.

The European patent document EP-AP No. 0136264 describes a joint for extrusions, in particular a corner joint between extruded rods in which clamping plates are provided with teeth. On positioning the corner connecting piece, the clamping plate engages in the groove which features undercut parts on both sides of its cross-section. By tightening the securing bolt the teeth of the clamping plate can to a certain extent be pressed into the material of the extrusion. The result is a mixed frictional and configurational locking action.

The British patent No. GB-PS 1503588 describes a joint used in the building industry, the said joint being a corner type joint. The grooves for introducing the clamping plate are essentially C-shaped with two flanges lying on one plane and two flanges bent over at right angles and running in the direction of the groove interior. The second two flanges are deformable. This deformation is achieved as a result of the clamping plate featuring on both sides at least one wedge and the corner joint a corresponding number of cone-shaped recesses. That solution requires a thin-walled extrusion having uniform material thickness in cross-section as, otherwise, it is not possible to achieve the necessary compression and shaping force with a bolt. The wedge-cone principle employed produces displacement of material at a point. It is difficult to see how this principle should work in practice. After its introduction into the longitudinal groove the plate has to be turned 90%; there is no face to act as a stop in the final position.

The object of the present invention is to develop a compressive joint which is not limited to thin-walled sections of uniform cross-sectional wall thickness and which, apart from the clamping action, also ensures mechanical, configurational locking action in all three directions in particular in the longitudinal direction of the extruded section making additional welding, bolting, rivetting or boring superfluous. A further object is a process for releasably connecting the extrusions.

SUMMARY OF THE INVENTION

With respect to the device the object of the invention is achieved by way of the invention in that each of the extrusion flanges, which in cross-section tends to taper in the direction of the longitudinal opening of the groove, features at least one weakening notch running in the longitudinal direction, and clamping cam tips lying on the flange beyond these weakening notches which are plastically deformed after tightening the securing bolt in the region of — basically parallelogram-shaped — clamping plates/plate turned 30–60° in the groove clamping plate and clamping cam tip are bent an equal distance from the longitudinal opening in the groove and four mechanical steps are formed to give a configurational locking action.

The clamping plates are preferably rotated in the groove by about 45°.

An essential difference with respect to the above mentioned patent document GB-PS No. 1503588 is that according to the present invention the continuous section need neither be thin-walled nor uniform in cross-section. Further, because of the provision of longitudinal weakening notches the section flanges can be plastically deformed instead of, as in GB-PS No. 1503588 the material having to be plastically displaced using the wedge-cone principle. Finally, according to the present invention use is made of clamping plates which contact the inner wall of the groove after being rotated 45° and not 90° in order to be brought into a position that is not prescribed by a stop or stops which would mean having to arrange wedges on the clamping plates coming into line with recesses in the component being attached.

BRIEF DESCRIPTION OF THE DRAWINGS

The invention is described in greater detail in the following with the aid of exemplified embodiments shown schematically in the drawings viz., FIG. 2 — a view of part of the compressive joint immediately before tightening, FIG. 3 — a view of part of the compressive joint with configurational interlocking, FIG. 4 — a view of part of the compressive joint with configurational interlocking and friction locking.

DETAILED DESCRIPTION

Figure 1:
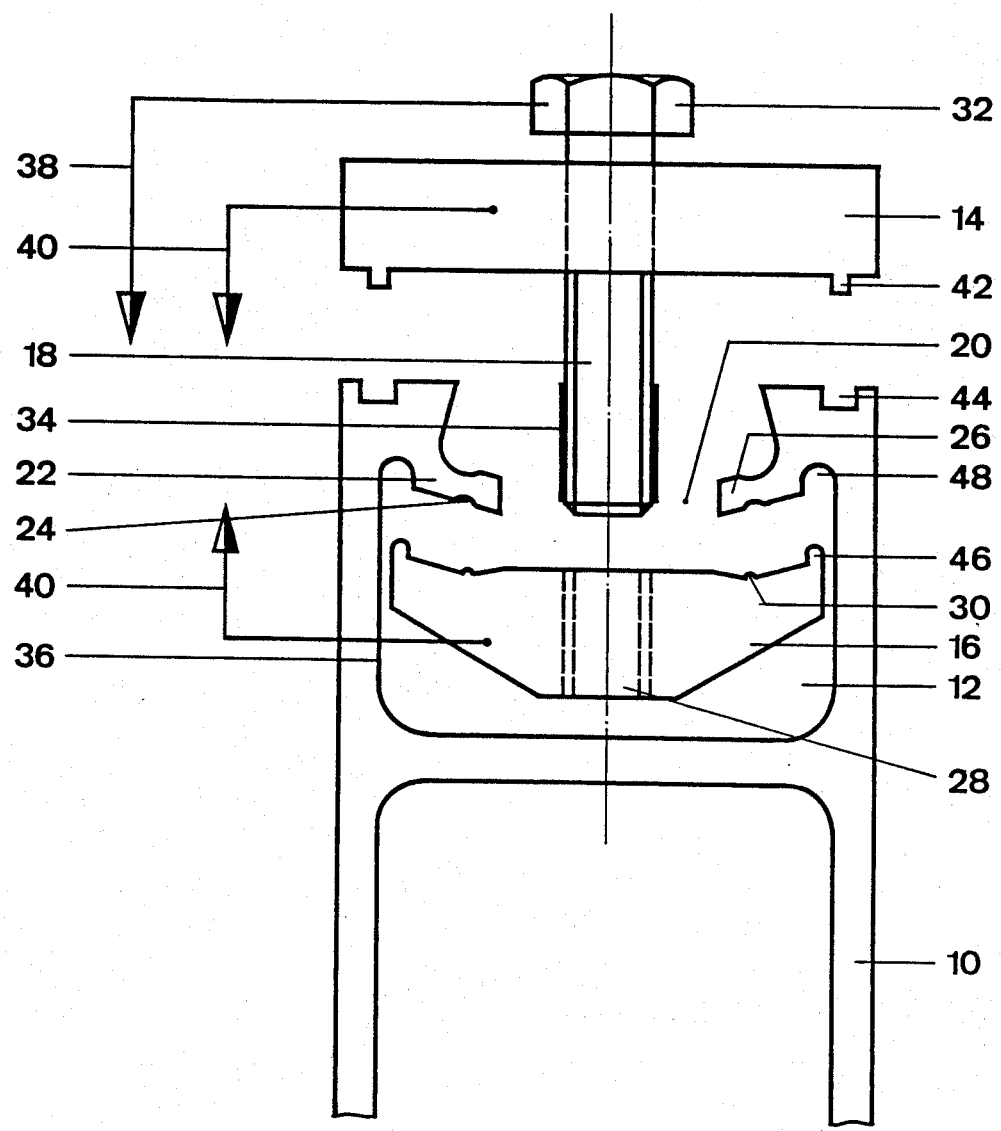
FIG. 1 — An exploded cross-section of the compressive joint.

The clamping plate have the basic shape of a parallelpiped features, on the side facing the flanges forming the undercut part of the groove, clamping plate cams running parallel to the short sides. These cams are arranged such that, on tightening the securing bolt, they are introduced into a corresponding recessed weakening notch in the lower side of the flange. The compressive force of the clamping plate cam on the curvature of the notch causes the material in the region of the notch to start to flow, until that force is counter balanced. Should the clamping plate cam contact the edge region of the notch, then a tensile force is also created.

The height of the clamping plate cams is preferably the same as the depth of the weakening notches in the undeformed flanges.

Each of the two flanges forming the undercut part of the longitudinal groove can feature more than one longitudinal weakening notch on its long sides. The effect according to the invention is created partly by the notch/notches and partly by the application of the lever principle. With non-changing cross-section in the region of the notch, first the region of the notch furthest from the groove wall is bent then, one after the other, the regions where notches are provided closer to the inner wall of the groove. This sequence of bending events is preferably reinforced by arranging the cross-sections of the material in the region of the weakening notches to diminish in the direction away from the inner wall of the groove.

The whole operation can be promoted by arranging the component that is to be attached to feature at least one projecting counterpart. This interaction with a notch and fixing (interlocking with) the flange undergoing deformation promotes further the step-wise deformation process.

With respect to the process the object is achieved by way of the invention in that part of the flanges, with a view to creating steps using the lever principle, are deformed plastically by means of at least one clamping plate that is compressed by tightening a securing bolt, as a result of which configurational locking is provided.

The securing bolt acting on the clamping plate is preferably tightened until the lower side of the clamping cam tip, which is bent in the region of the weakening notch, rests against the contact surface of the clamping plate. Meant here as clamping cam tip is a region of the section flange lying, with respect to the inner wall of the groove, outwith a weakening notch.

If the clamping plate features cams on the side facing the section flanges, the securing bolt is preferably tightened further until the clamping plate cams cause the material in the region of the notch concerned to flow.

If the flanges feature, close to the groove walls, contact faces that do not deform or do so to a negligible degree, then the securing bolt is preferably tightened still further until the outer contact faces of the clamping plate rest against the contact faces of the section flanges and provide frictional locking in addition to the configurational locking.

On bringing the two contact surfaces together the secure safe position is reached. This then makes it impossible for the deformed clamping cam tips to be pressed out or to be overtightened. If, as a result of any kind of overstressing as a result of an accident or for any other reason a bent clamping cam tip for providing mechanical, configurational locking should break, then the non-bent tip acts as a mechanical buffer and can take over the function of providing a clamping connection along with the frictional locking provided by the contact faces.

Before screwing the securing bolt into the clamping plate, its thread can be coated with a special adhesive mass. This makes it easier to rotate the clamping plate 45° into the working position and ensures better resistance to vibrational effects acting on the joint.

The normal structural materials that exhibit the necessary mechanical strength and formability can be used for manufacturing the continuous section, the component to be attached and the clamping plates. The choice of material is then a question of sizes, dimensions, formability, elasticity, elongation etc. Particularly suitable materials are aluminum and aluminum alloys, steel and plastics.

With all materials it must be possible via plastic bending to achieve at least four permanent mechanical steps per clamping plate i.e. configurational locking which guarantees the safety of the clamping connection in all three dimensions, in particular in the longitudinal direction of the continuous section.

The areas of application for the invention are in particular in vehicle manufacture such as vehicles for road and rail, levitated vehicles, shipbuilding, and in building construction.

Examples of continuous sections are roof, upper and middle girders, posts, cross-beams, longitudinal beams and roof arch struts in vehicles. The continuous sections can be in the form or solid or hollow sections and with respect to their cross-sections can have any shape of choice. As example for components to be attached can be mentioned corner connections, seat fixtures, clamping facilities and cushioning supports.

A simple version of a compressive joint is shown in FIG. 1 and comprises essentially of a continuous extruded section 10 with undercut groove 12, a part 14 to be connected and a clamping plate 16 with securing bolt 18. A groove 12 with longitudinal opening 20 in the direction of part 14 features two extrusion flanges 22 forming the undercut part of the groove 12. A weakening notch 24 is provided on the underside of the flanges 22. The ends of the flanges 22 between the notch 24 and the longitudinal opening 20 is designated as clamping cam tip 26.

The part 14 to be attached is shown here as a simple plate; it can, however, also be for example in the form of a corner joint.

The clamping plate 16, which is parallellogram-shaped as viewed from part 14, features a threaded hole 28 for the securing bolt 18 and at each side a clamping plate cam 30.

The securing bolt 18 carries an adhesive mass 34 on the thread at the opposite end from the head 32. When forming a compressive joint the securing bolt 18 is not, as illustrated in FIG. 1, screwed into the clamping plate 16 already in the groove 12. The clamping plate/plates 16 is/are screwed on outside the groove 12 with the securing bolts 18 passing through part 14, introduced in the direction of the longitudinal opening 20, corresponding to the longitudinal direction c (FIG. 5) of the continuous extruded section 10, through the longitudinal opening 20 into the groove 12, brought to a stop against the inner wall 36 of groove 12 by rotating 45°, and the securing bolt 18 tightened. This direction of assembly is indicated with the arrow 38. Arrows 40 indicate the direction of tension when the clamping plate 16 has reached the flanges 22 and the securing bolt 18 has been tightened further.

The stop 42 on component 14 and the corresponding alignment means 44, as well as the stop 46 on the clamping plate 16 and the corresponding means of alignment 48 serve to accommodate the tolerance fit.

In FIG. 2 the clamping plate 16 has been raised to such an extent that the cam tips 26 on flange 22 form a line contact 50. It is of great significance that the shape of the clamping plate 16 is chosen with regard to the clamping cam tip 26.

In this first stage of assembly the clamping plate 16 presses with the greatest leverage on the clamping cam tip 26 as the securing bolt 18 is tightened further (FIG.

1). The flange 22 is bent in the region 52 of the weakening notch 24. The angle between the lower side 54 of the clamping cam tip 26 and the inner contact surface 56 of the clamping plate 16 begins to close without the lower side 54 itself being deformed.

As shown in FIG. 3, the clamping cam tip 26 of flange 22 is bent in region 52 at the weakening notch 24 to such an extent that the lower side 54 of the cam tip 26 and the inner face 56 of the clamping plate 16 come together.

During the bending of the clamping cam tip 26 the clamping plate cam 30 enters the notch 24 and causes a tensile and/or compressive force to be applied to the already deformed tip 26.

A bent tip 26 is formed only in the region of the clamping plate 16, which leads to four steps or mechanical stops for configurational locking.

The clamping cam 30 must be designed accurately with respect to the geometry of the flange 22, especially with respect to the position and shape of the weakening notch.

In region 58 of the flange 22 there is no or no noticeable bending. The non-bendable stop face 60 on flange 22 and the outer contact surface 62 of the clamping plate 16 lie against each other, but without applying force to each other.

In FIG. 4 the non-deformable or only unnoticeably bendable contact face 60 of flange 22 and the outer contact face 62 of clamping plate 16 are pressed hard together by turning the securing bolt 18 further. They form a frictional lock, which reinforces or if necessary replaces the configurational locking. This position is designated as the safety position.

Figure 5:
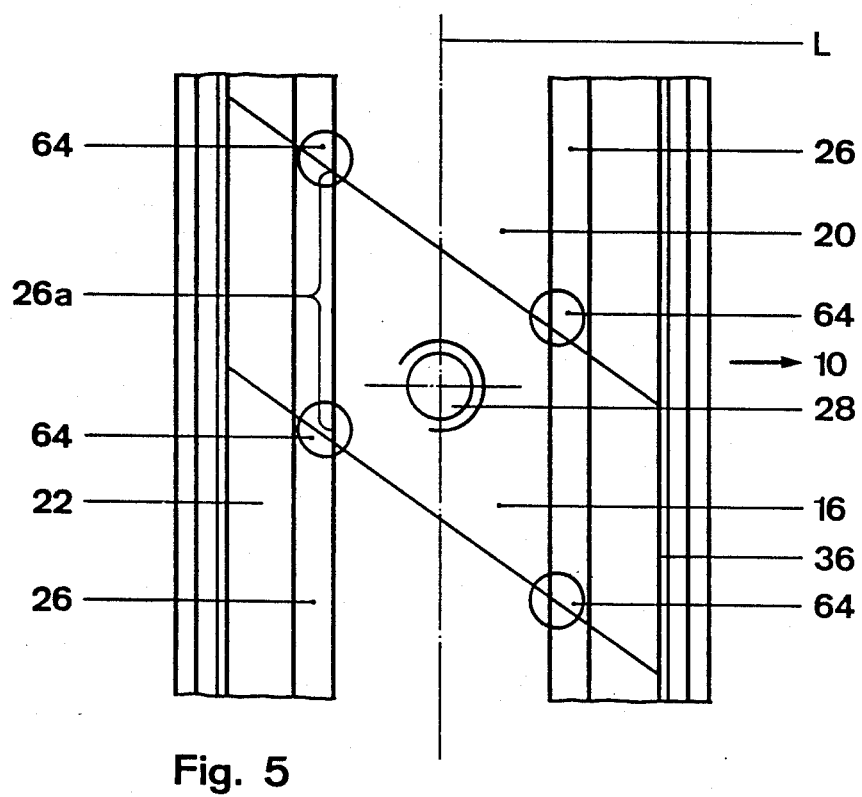
FIG. 5 — a plan view of a compressive joint with connecting component omitted.

The basic, parallelpiped form of the clamping plate 16 can be seen in FIG. 5. This has been pressed against the flanges 22 by the securing bolt 18 (FIG. 1) until the position shown in FIG. 4 is reached. In the region of the clamping plate 16 the clamping cam tip 26a has been bent and four mechanical locking points or steps 64 created.

Figure 6:
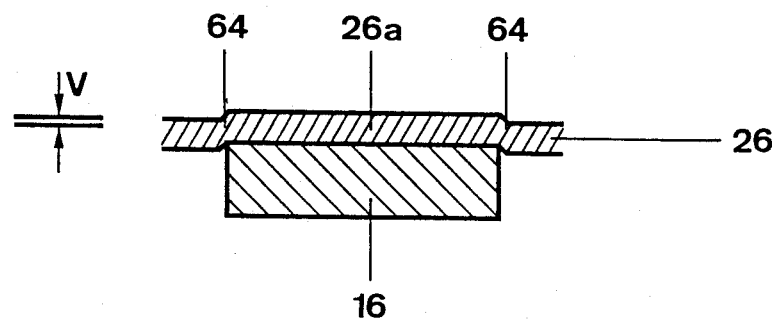
FIG. 6 — a partial cross-sectional view through the clamping cam tip and the clamping plate.

The steps 64 can be seen clearly in the cross-section shown in FIG. 6. The clamping cam tip 26 is displaced by an amount V in region 26a and forms an effective locking mechanism especially in the longitudinal direction L (FIG. 5) of the continuous section 10.

Figure 7:
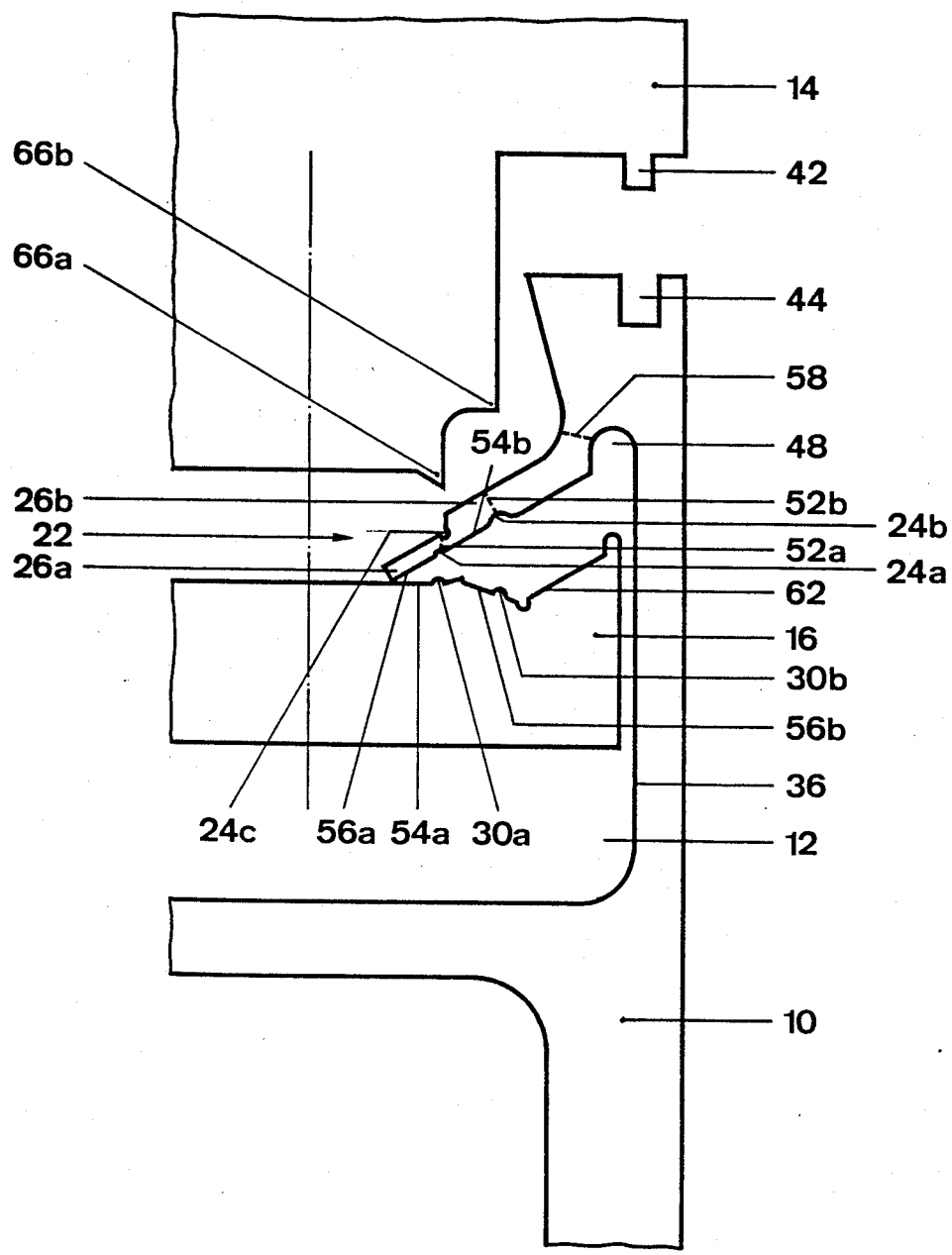
FIG. 7 — a view of part of a compressive joint, in a partly exploded representation, before tightening.

In the version shown in FIG. 7 the bending of the section flange 22 is performed by the clamping plate 16 and also the component 14.

The flange 22 is complicated in design in that it features two longitudinal weakening notches 24a and 24b into which the clamping plate cams 30a and 30b are pressed on bending. A further weakening notch 24c is provided in the upper region between the clamping cam tip parts 26a and 26b.

The part 26a of the clamping cam tip forming the longitudinal groove 12 is clearly thinner than the adjoining part 26b running in the direction of the inner wall 36 of the groove 12.

In the edge region of component 14 there are two projections 66, an inner projection 66a and an offset projection 66b. The projections 66 are, as the clamping plate cams 30, aligned with the weakening notches 24 of the extrusion flanges 22. These projections 66 serve to promote the bending of the flanges 22.

The compressive joint as illustrated in FIG. 7 is created in a number of steps.

1st step: Bending of the clamping cam tip part 26a via clamping plate 16 by taking advantage of the large leverage effect and the smallest cross-sectional area in region 52a of weakening notch 24a.

2nd step: Pressing clamping plate cam 30a into the weakening notch 24a to create a tensile and/or compressive force.

3nd step: Pressing projection 66a on component 14 onto the section flange 22.

4th step: Introducing new deformation by simultaneous application of the clamping plate 16 and projection 66b onto region 52b of the weakening notch 24b.

5th step: Pressing clamping plate cam 30b into the weakening notch 24b to create a new tensile and/or compressive force.

6th step: Pressing together the non-deformable contact face 60 of flange 22 and the outer contact face 62 of the clamping plate to create frictional locking.

After the third stage the lower side 54a of the clamping cam tip part 26a and the contact surface 56a of the clamping plate lie against each other, after the fifth stage correspondingly the lower side 54b and the inner contact surface 56b. After the last stage configurational and friction locking, also called a safety position, has been achieved.

In the version according to FIG. 7 eight steps are created as two clamping cam tip parts 26a, 26b are bent on both sides.

What is claimed is:

1. Releasable clamping-type compressive joint which comprises a continuous section having, at least one groove that is undercut on both sides thereof and flanges forming said undercut, wherein said groove runs in the longitudinal direction of said section and forms a longitudinal opening, a component engagable with said continuous section, a securing bolt, at least one clamping plate that can be introduced into the groove and turned by means of the securing bolt, said clamping plate engaging with the flanges on the continuous section on tightening the securing bolt and the continuous section being partly deformed by the clamping plate, said flanges tapering in cross-section toward the longitudinal opening of the groove and each include at least one weakening notch extending in the longitudinal direction of said section and having clamping cam tips on the flanges beyond said notches which are plastically deformed by a region of the clamping plate after tightening the securing bolt, and which plates are essentially in the shape of a parallelpiped and are configured to be rotated 30°-60° in the groove such that four mechanical steps providing configurational locking are created per clamping plate and clamping cam tip bent an equal distance from the longitudinal opening in the groove.

2. Compressive joint according to claim 1 wherein the clamping plate includes clamping plate cams on the side facing the flange which, on tightening the securing bolt, press into the related weakening notch and exercise a force on the deformed material of the flange.

3. Compressive joint according to claim 2 wherein the clamping plate cams are as high as the depth of the weakening notches in the undeformed flanges.

4. Compressive joint according to claim 1 wherein the groove has an inner wall and wherein the flanges each feature a contact surface near their inner wall of the groove to produce friction locking with corresponding contact surfaces on the clamping plate.

5. Compressive joint according to claim 1 wherein above at least one weakening notch the component engagable with the continuous section includes a projection which promotes the deformation of the clamping cam tip of the flanges lying beyond the weakening notch.

6. Compressive joint according to claim 1 including two of said weakening notches, wherein the cross-section of the clamping cam tip adjacent to the longitudinal opening of the groove is smaller than that region of the clamping cam tip between the notches.

7. Process which comprises, providing a releasable clamping-type compressive joint according to claim 1, releasably joining said continuous section to said component engagable therewith in which parts of the flanges are plastically bent to form steps making use of the lever principle by means of at least one of said clamping plates which is compressed by tightening said securing bolt, as a result of which configurational locking is provided.

8. Process according to claim 7 wherein the securing bolt of the clamping plate is tightened until the lower side of the clamping plate tip which is bent in the region of the weakening notch rests against the contact surface of the clamping plate.

9. Process according to claim 8 wherein the securing bolt is tightened further until the clamping plate cam causes the material in the weakening notch to flow.

10. Process according to claim 9 wherein the securing bolt is tightened further until the outer top face of the clamping plate makes surface contact with the contact surface of the flange, thus providing frictional locking.

* * * * *